June 26, 1973  J. D. COURY  3,741,811

BATTERY ACTUATED BY LINEAR AND ANGULAR ACCELERATION

Filed Dec. 20, 1971

INVENTOR,
JOSEPH D. COURY

BY
Harry M. Saragovitz
Edward J. Kelly
Herbert Berl
Saul Elbaum
ATTORNEYS

United States Patent Office 3,741,811
Patented June 26, 1973

3,741,811
BATTERY ACTUATED BY LINEAR AND
ANGULAR ACCELERATION
Joseph D. Coury, Wheaton, Md., assignor to the United
States of America as represented by the Secretary of
the Army
Filed Dec. 20, 1971, Ser. No. 209,795
Int. Cl. H01m 17/06
U.S. Cl. 136—90                                    4 Claims

ABSTRACT OF THE DISCLOSURE

A self actuated battery is disclosed which is supplied with an electrolyte from a self opening ampule. When the battery is spinning on its cylindrical axis and subjected to axial acceleration, a diaphragm across the end of the ampule is punctured by a novel and unique cutter which responds to the combination of linear and angular acceleration forces, thereby allowing the electrolyte to flow from the ampule through a filled channel into the battery cells.

---

The invention described herein may be manufactured, used and licensed by or for the United States Government for governmental purposes without the payment to me of any royalty thereon.

The present invention relates to reserve sources of electrical energy and, in particular, to batteries of the self actuating type.

Self actuating batteries that respond to spin and/or linear acceleration have heretofore presented serious disadvantages to the designers of devices in which they have been employed. The most significant disadvantage has been cost. Batteries of this type normally represent a substantial portion of the cost of the devices in which they have been incorporated and in many cases, the battery has been the most expensive item. In general wet cell series batteries have been used and these, in addition to high cost, have shown an inability to differentiate between accidental drop and the forces to which they are designed to respond, susceptibility to inter-cell short circuits due to uneven filling of the cells, and unreliable response to activating forces.

Many of the problems associated with self actuating batteries have been alleviated by the invention disclosed and claimed in U.S. Pat. 3,507,707, issued to Allan M. Biggar, and assigned to the United States of America as represented by the Secretary of the Army. The battery of the Biggar patent has greatly reduced the cost of such batteries and substantially eliminated the susceptibility to inter-cell short circuits due to uneven filling of the cells. However, the reliability of the Biggar battery is impaired by the unreliability of the actuating means and the inability of the actuating means to differentiate between accidental dropping and the forces to which it is designed to respond.

It is accordingly an object of the present invention to provide a reliable self actuating battery.

A further object of the present invention is to provide a self actuating battery that will reliably respond to activating forces.

Still another object of the present invention is to provide a self actuated battery which will not respond to incidental forces.

Briefly these and other objects are attained in a battery comprising two or more electrodes with appropriate separators between them which is supplied with electrolyte from a self opening ampule located at one end of the electrode stack. When the battery is subjected to both linear and angular acceleration a diaphragm across the end of the ampule nearest the battery plates is caused to be punctured by unique and novel opening means, hereinafter more completely described, thereby allowing the electrolyte to flow from the ampule into the cell through a channel near the periphery until equilibrium is reached. In order to alleviate the problem of inter-cell short circuits, the channel through which the electrolyte enters the cell is preferably completely cleared of electrolyte after the cell is filled. This is accomplished by purging the filled channel with a non-conductive, high density liquid released from the ampule shortly after the electrolyte is released.

The specific nature of the invention, as well as other objects, aspects, uses and advantages thereof will clearly appear from the following description and from the accompanying drawing in which.

Figure 1A:
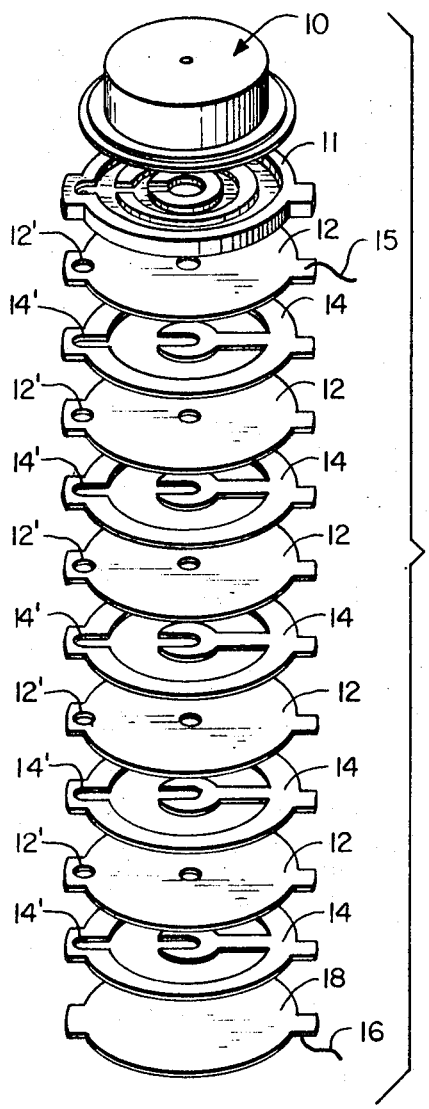
FIG. 1A is an exploded view of a typical embodiment of an entire battery assembly according to the present invention.

In the embodiment of the battery shown in FIG. 1A, a lead-lead dioxide-fluoboric acid electrochemical system is employed. Wet cell series batteries have long been recognized as being particularly suitable for an application such as the one described herein. Previous experience has shown that cells consisting of lead and lead oxide plates with fluoboric acid as the electrolyte offer advantages over other known systems and that they have a long shelf life, require no field maintenance, meet rapid rise time requirements, and operate well between —40 and +165° Fahrenheit. The battery assembly of FIG. 1 comprises the following parts: a self actuating ampule 10, fluid channeling means 11, a stack of lead-lead oxide bimetal electrodes 12, a series of paper gaskets 14 separating each of the electrodes 12 and an end plate 18. The electrodes 12 are made from a bi-metal strip having a thin steel base with a plating of metallic lead on one side and a plating of lead oxide on the other. The separators 14 are conveniently formed from thin strips of commercial bristol board. On the periphery of each electrode 12 and separator 14 holes 12' and 14' respectively, are punched. These holes, when the battery is assembled, will form the fill channel through which the electrolyte will pass when released from ampule 10. End plate 18 is slightly different from the other electrodes 14 in that no holes are punched on it and each side of it is plated with metallic lead. Separators 14 are bonded to an adjacent electrode 12 by heating a commercially available, two-ply laminating film with which each is coated. Channelling means 11 placed above the electrode stack is necessary to directly control the flow of electrolyte and, preferably, heavy non-conductive liquid into the fill channel formed by holes 12' and 14'.

Figure 2:
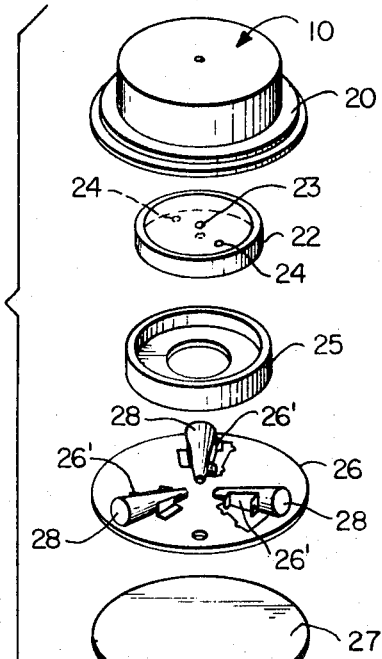
FIG. 2 is an exploded view of a typical embodiment of the ampule assembly.
Figure 3:
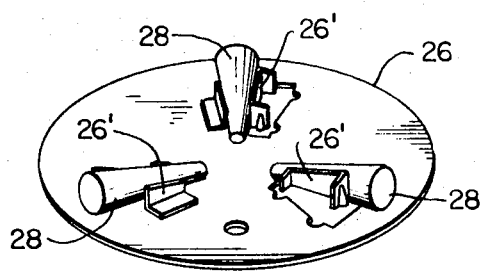
FIG. 3 is an isometric view of the novel opening means of the present invention used to puncture the diaphragm of the ampule containing the electrolyte.

Upon the application of spin and linear acceleration forces to which the battery is designed to respond, ampule 10, in a manner to be described in greater detail with respect to FIGS. 2 and 3, will release the electrolyte, in this case fluoboric acid, through channelling means 11 and the fill channel formed by holes 12' and 14' into the electrode stack, thereby activating the battery. If, however, any of the electrolyte should remain in the fill channel the battery would be subject to intercell short circuits. To forestall this possibility, ampule 10 shortly after releasing the electrolyte and in a manner to be described in greater detail with respect to FIG. 2, preferably releases a high density, non-conductive liquid such as methylene bromide into the fill channel to purge it of electrolyte. Upon activation, voltage is attainable from the terminal wires 15 and 16 attached to the electrode 12 nearest the ampule and in plate 18 respectively.

Figure 1B:
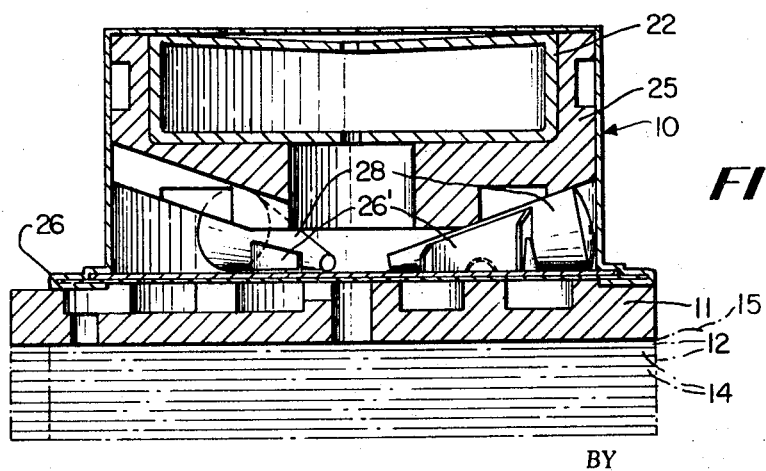
FIG. 1B is a side view of a typical embodiment of the assembled battery shown in FIG. 1A.

FIG. 1B is a side view of the completely assembled battery with like numbers referring to like elements as in FIG. 1A. Ampule 10 is bonded to channelling means 11 which is bonded in turn to the electrode stack comprising electrodes 12, separators 14 and end plate 18. Terminal wires 15 and 16 are connected to the uppermost of electrodes 12 and end plate 18 respectively.

In FIG. 2 there is shown an exploded view of the complete ampule assembly 10 which stores the electrolyte and preferably the high density, non-conductive liquid and releases them in proper sequence for the battery to properly function as described above.

Self actuated batteries of the liquid electrolyte type must be designed so that the electrode materials are not corroded by the electrolyte or its fumes prior to activation of the battery. It has been common practice to store the electrolyte in an ampule of glass, metal or plastic until activation and then to puncture the container.

The fluoboric acid used as an electrolyte in the embodiment described herein emits highly corrosive fumes. In view of the permeability of plastic materials to gases it is believed that a plastic container would be of questionable value for long term storage. While glass containers would adequately confine the electrolyte and its fumes, it would be difficult to insure that there would be no accidental breakage during rough handling but dependable breakage when the battery is exposed to forces to which it is designed to respond. Most metals are attacked by fluoboric acid but in the absence of oxidizing agents, copper will remain unscathed. For this reason it is preferred to use an ampule made of copper.

The ampule assembly 10 as shown in FIG. 2 is contained in a thin walled, flanged copper cup 20. Capsule 22 placed inside cup 20 is a shallow, enclosed hollow cylinder which serves as a container for the dense non-conductive liquid. Capsule 22 is filled with a finely divided granular, fibrous or spongy solid that has a greater affinity for the dense liquid than the electrolyte so that only the dense liquid is absorbed therein. In this embodiment this dense liquid, methylene bromide, is preferentially absorbed into a polypropylene or Dynel fiber mass. Annular copper cup 25 fits around and against capsule 22 and provides the inertial force to activate the cutting member and release the electrolyte as described below. Cutter member 26 and its associated bearing members 28 are placed between the ring 25 and diaphragm 27, by crimping or the like, seals the entire assembly and the electrolyte into cup 20.

In operation, diaphragm 27, which is preferably a thin sheet of copper foil, is punctured by cutter leaflets 26', which have cutting points mounted on them perpendicular thereto, to release the electrolyte in cup 20 and later the dense liquid in capsule 22. This puncturing operation is accomplished by bending cutter leaflets 26' from their normal vertical position to substantially a horizontal position to bring the cutting points into contact with diaphragm 27. When the battery is subjected to sufficient spin and linear acceleration, the intertial mass of ring 25, which is selected to have a significantly higher specific gravity than the electrolyte, serves as a driving member for the bearing members 28 forcing the bearing members 28 to engage and deflect the cutter leaflets 26'. Preferably cutter 26 is manufactured from half hard copper strip, and cutter leaflets 26' thereby provide sufficient spring pressure to resist the forces of the bearing members 28 until folded over by the combined action of a load produced by linear acceleration and an angular force provided by angular acceleration. Accidental shocks are therefore highly unlikely to produce the necessary combination of forces.

The desirability of employing a high density, non-conductive liquid to purge the fill channel and using the same container for both the electrolyte and the dense liquid are adequately described by Biggar, and the advantages which accrue make such a system preferred in the present invention as well. The advantages of using the same container for both the electrolyte and the dense liquid are readily apparent but disadvantages at the time of activation and release into the cell can be seen. The flow of the liquids from the ampule into the cells probably would take place at high enough velocity to sweep all of the dense liquid into the cells most remote from the ampule; this could create in the remote cells an electrolyte deficiency and in the cells nearer the ampule the possibility of short circuits due to a failure to isolate them. Thus the design of the electrolyte-dense liquid releasing system of Biggar resolved itself into a solution of the problem of designing a sequencing means whereby the release of the dense liquid is delayed until flow of the electrolyte into the cells is complete. The system isolates the cells as soon as practicable after they have been filled with the electrolyte in order to minimize short circuit losses occurring prior to isolation.

In the design arrived at, the dense liquid in this embodiment, methylene bromide, is put into capsule 22 and absorbed into a polypropylene fiber mass. When a battery is subjected to spin forces, centrifugal force acting on a polypropylene fiber mass will cause the methylene bromide absorbed therein to separate and escape through holes 24 on the periphery of each end of capsule 22. Because holes 23 are at the axis of rotation they are neutral and no dense liquid escapes therefrom. The time consumed by the dense liquid in escaping from holes 24 and proceeding across the boundary area between capsule 22 and the holes punctured in diaphragm 27 is sufficient to allow the electrolyte to fill each of the cells and substantially reach a state of equilibrium. Upon release the dense liquid will purge the electrolyte from the filled channel, isolating each of the cells.

The battery of the present invention is substantially unresponsive to accidental dropping in tests where it is dropped from heights of from 6-10 feet simulating the handling that might be expected in shipping. After such drops the batteries operate as expected and described herein when subjected to the forces to which they are designed to respond.

In FIG. 3 the novel opening means are illustrated showing cutter plate 26 and cutting members 26', and their relationship to bearing members 28 which are driven by the annular copper cup 25 which serves as the force responsive driving means for actuation of the battery. While the bearing members 28 are illustrated in the present embodiment in the preferred form as tapered rollers, it will be readily apparent to those of ordinary skill in the art they any convenient form of bearing member which can be driven by driving member 25 to engage and deflect the related cutting member 26' will suffice. Alternate forms of bearing member would include cylindrical rollers, ball bearings, and the like. A number of alternative or cooperative means can be employed to position the bearing members 28 in relationship to the cutter plate 26 and the cutting members 26'. For example, as shown in FIG. 3, the annular ring driving member 25 can be grooved to engage the roller bearing members 28. Other alternatives would include a retaining ring to interconnect a plurality of bearing members, i.e. in the case of the embodiment shown in the drawing the three bearing members 28, or the cutting member plate 26 can be arranged to provide an additional number of bearing positioning tabs, depressions, or projections.

In operation the opening means of the present invention provide improved operation since the particular arrangement requires both substantial linear acceleration and substantial angular acceleration in order to transmit the opening force from driving member 25 through bearing members 28 to the cutting members 26'. The employment of the bearing members 28 provides a substantially greater margin of reliability than the arrangement employed in the aforementioned Biggar patent wherein the cutting members 26' can be driven directly by driving member 25 by the imposition of accidental and/or incidental forces.

It should be understood that the invention is not limited to the exact details of construction shown and described herein for obvious modifications will occur to persons skilled in the art.

What is claimed is:

1. A battery actuated by a combination of linear and angular acceleration comprising:
    (a) at least one electrical cell comprising a pair of electrodes activated by an electrolyte,
    (b) conduit means for introducing an electrolyte into said cell,
    (c) containing means for storage of an electrolyte,
    (d) opening means for said containing means actuated by a combination of linear and angular acceleration causing said containing means to introduce an electrolyte into said conduit means and thence into said cell, said opening means comprising at least one cutting member disposed to be deflected by driving means to rupture said containing means, said driving means comprising at least one bearing member adapted to engage and deflect said cutting member and acceleration-responsive member engaged with said bearing member adapted to transmit acceleration forces to said bearing member, whereby said bearing member engages and deflects said cutting member during angular movement;
    (e) an electrolyte contained in said containing means, and
    (f) a pair of terminals, connected to said cell, adapted to transmit electrical energy generated in said battery.

2. The battery of claim 1 wherein said bearing member is a tapered roller bearing.

3. The battery of claim 2 wherein said acceleration responsive member engages said bearing member by virtue of shaped recesses on the engaging surface thereof.

4. The battery of claim 1 wherein said cutting member is a plate with cutting tabs projecting from one side thereof in such an arrangement that angular rotation of bearing members will engage and deflect said cutting tabs.

References Cited
UNITED STATES PATENTS

| | | | |
|---|---|---|---|
| 3,162,548 | 12/1964 | Bennett | 136—90 |
| 3,193,413 | 7/1965 | Tamminen | 136—90 |
| 3,346,420 | 10/1967 | Snyder | 136—90 |
| 3,507,707 | 4/1970 | Biggar | 136—90 |

ANTHONY SKAPARS, Primary Examiner

U.S. Cl. X.R.

136—114